United States Patent
Wilson et al.

(10) Patent No.: US 11,639,672 B2
(45) Date of Patent: May 2, 2023

(54) VALVE SEAT FOR AUTOMOTIVE CYLINDER HEAD

(71) Applicant: GM Global Technology Operations LLC, Detroit, MI (US)

(72) Inventors: Daniel J. Wilson, Linden, MI (US); Huaxin Li, Rochester Hills, MI (US); Edward J. Keating, Ortonville, MI (US); Liang Wang, Rochester Hills, MI (US); Devin R. Hess, Clarkston, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 170 days.

(21) Appl. No.: 17/101,425

(22) Filed: Nov. 23, 2020

(65) Prior Publication Data
US 2022/0162968 A1   May 26, 2022

(51) Int. Cl.
*F01L 3/02* (2006.01)
*C22C 9/06* (2006.01)
*B23K 35/30* (2006.01)
*B23K 26/34* (2014.01)
*B23K 103/12* (2006.01)

(52) U.S. Cl.
CPC ............... *F01L 3/02* (2013.01); *B23K 26/34* (2013.01); *B23K 35/302* (2013.01); *C22C 9/06* (2013.01); *B23K 2103/12* (2018.08)

(58) Field of Classification Search
None
See application file for complete search history.

(56) References Cited

U.S. PATENT DOCUMENTS

| | | | |
|---|---|---|---|
| 2005/0031892 A1* | 2/2005 | Mazumder | C22C 9/06 420/487 |
| 2018/0272471 A1* | 9/2018 | Aoyama | B23K 26/34 |
| 2018/0272472 A1* | 9/2018 | Aoyama | F02M 61/18 |

* cited by examiner

*Primary Examiner* — Elizabeth Collister
(74) *Attorney, Agent, or Firm* — Vivacqua Crane, PLLC

(57) ABSTRACT

A valve seat formed within an aluminum engine component includes a valve seat surface machined within the aluminum engine component, a layer of copper alloy material laser clad onto the valve seat surface of the aluminum engine component, the layer of copper alloy material having a thickness of less than 2.0 millimeters, and a layer of copper alloy/tool steel carbide material laser clad onto the layer of copper alloy material, the layer of copper alloy/tool steel carbide material having an average thickness of less than 0.5 millimeters, wherein the layer of copper alloy/tool steel carbide material has an outer surface that is machined to a final valve seat profile.

20 Claims, 3 Drawing Sheets

VALVE SEAT FOR AUTOMOTIVE CYLINDER HEAD

INTRODUCTION

The present disclosure relates to a valve seat for a valve in a cylinder head for an automotive engine.

The valve seat in an internal combustion gasoline or diesel engine is the surface against which an intake or an exhaust valve rests during the portion of the engine operating cycle when that valve is closed. The valve seat is a critical component of an engine in that if it is improperly positioned; oriented, or formed during manufacture, valve leakage will occur which will adversely affect the engine compression ratio and therefore the engine efficiency, performance (engine power and engine torque), exhaust emissions, and engine life.

The exhaust valves take heat from the combustion chamber and the valve seats for exhaust valves help to cool the exhaust valves by drawing heat away from the exhaust valves and conducting heat into the cylinder head.

A valve seat must do several things. It must support and seal the valve when the valve closes, it must cool the valve, and it must resist wear and recession. Valve seats experience thermal stress as a result of the cylinder head's expansion and contraction as it goes through its normal operating cycle (cold start, warmup, running and shutdown). Valve seats experience frictional stress as the valve opens and closes due to the valve's relative motion. Finally, valve seats experience impact stress as the valve strikes the valve seat when the valve opens and closes. The more aggressive the cam profile, the more severe the impact stress is, particularly when the engine is running at high RPMs.

Inexpensive engines may have valve seats that are simply cut into the material of the cylinder head or engine block (depending on the design of the engine). This is not optimal, as the material used for the engine block or cylinder head, such as aluminum, does not have material properties suitable to withstand the various stresses that the valve seat will undergo.

Valve seats are often formed by first press-fitting an approximately cylindrical piece of a hardened metal alloy into a cast depression in a cylinder head above each eventual valve position, and then machining a conical-section surface into the valve seat that will mate with a corresponding conical section of the corresponding valve. Generally two conical-section surfaces, one with a wider cone angle and one with a narrower cone-angle, are machined above and below the actual mating surface, to form the mating surface to the proper width (called "narrowing" the seat), and to enable it to be properly located with respect to the (wider) mating surface of the valve, so as to provide good sealing and heat transfer, when the valve is closed, and to provide good gas-flow characteristics through the valve, when it is opened. This method involves added manufacturing steps and cost.

Valve seats are also formed by spraying or cladding a material onto a valve seat that is machined into the cylinder head. Spray coating and cladding processes generally do not form a bond between the cylinder head and the valve seat material that will withstand the stresses experienced by the valve seat during operation of the engine. This is particularly a problem for valve seats of exhaust valves because valve seats for exhaust valves are exposed to much higher temperatures than the valve seats for intake valves.

Thus, while current valve seats achieve their intended purpose, there is a need for a new and improved valve seat and method for forming a valve seat that provides a cladding of a high strength alloy onto an aluminum cylinder head wherein the bond between the high strength alloy and the aluminum cylinder head is suitable to withstand the various stresses experience by the valve seat during operation of the engine.

SUMMARY

According to several aspects of the present disclosure, a method of forming a valve seat within an aluminum engine component includes machining and cleaning a valve seat surface within the aluminum engine component, depositing a layer of copper alloy material onto the valve seat surface of the aluminum engine component, depositing a layer of copper alloy/tool steel carbide material onto the layer of copper alloy material, and machining an outer surface of the layer of copper alloy/tool steel carbide material to a final valve seat profile.

According to another aspect, depositing the layer of copper alloy material onto the valve seat surface of the aluminum engine component further includes laser cladding a layer of copper alloy material onto the valve seat surface of the aluminum engine component.

According to another aspect, an average thickness of the layer of copper alloy material that is laser clad onto the valve seat surface is less than 0.5 millimeters.

According to another aspect, depositing the layer of copper alloy/tool steel carbide material onto the layer of copper alloy material further includes laser cladding a layer of copper alloy/tool steel carbide material onto the layer of copper alloy material.

According to another aspect, an average thickness of the layer of copper alloy/tool steel carbide material that is laser clad onto the valve seat surface is less than 0.5 millimeters.

According to another aspect, the chemical composition of the copper alloy material includes from about 50% to about 70% of copper, from zero to about 30% of nickel, and from zero to about 0.5% titanium.

According to another aspect, the chemical composition of the copper alloy/tool steel carbide material includes from about 50% to about 70% of copper, from zero to about 30% of nickel, from zero to about 30% of aluminum, from zero to about 10% of iron, from zero to about 8% of manganese, from zero to about 10% of silicone, and from zero to about 10% tool steel.

According to another aspect, an average combined thickness of the layer of copper alloy material and the layer of copper alloy/tool steel carbide material is less than 1 millimeter.

According to another aspect, the layer of copper alloy material and the layer of copper alloy/tool steel carbide material are laser clad with a wire feed laser cladding process.

According to another aspect, the layer of copper alloy material and the layer of copper alloy/tool steel carbide material are laser clad with a powder feed laser cladding process.

According to several aspects of the present disclosure, a valve seat formed within an aluminum engine component includes a valve seat surface machined within the aluminum engine component, a layer of copper alloy material deposited onto the valve seat surface of the aluminum engine component, and a layer of copper alloy/tool steel carbide material deposited onto the layer of copper alloy material, wherein the layer of copper alloy/tool steel carbide material has an outer surface that is machined to a final valve seat profile.

According to another aspect, the layer of copper alloy material is laser clad onto the valve seat surface of the aluminum engine component.

According to another aspect, an average thickness of the layer of copper alloy material is less than 0.5 millimeters.

According to another aspect, the layer of copper alloy/tool steel carbide material is laser clad onto the layer of copper alloy material.

According to another aspect, an average thickness of the layer of copper alloy/tool steel carbide material is less than 0.5 millimeters.

According to another aspect, the chemical composition of the copper alloy material includes from about 50% to about 70% of copper, from zero to about 30% of nickel, and from zero to about 0.5% titanium.

According to another aspect, the chemical composition of the copper alloy/tool steel carbide material includes from about 50% to about 70% of copper, from zero to about 30% of nickel, from zero to about 30% of aluminum, from zero to about 10% of iron, from zero to about 8% of manganese, from zero to about 10% of silicone, and from zero to about 10% tool steel.

According to another aspect, an average combined thickness of the layer of copper alloy material and the layer of copper alloy/tool steel carbide material is less than 1 millimeter.

According to several aspects of the present disclosure, a valve seat formed within an aluminum engine component includes a valve seat surface machined within the aluminum engine component, a layer of copper alloy material laser clad onto the valve seat surface of the aluminum engine component, the layer of copper alloy material having an average thickness of less than 0.5 millimeters, and a layer of copper alloy/tool steel carbide material laser clad onto the layer of copper alloy material, the layer of copper alloy/tool steel carbide material having an average thickness of less than 0.5 millimeters, wherein the layer of copper alloy/tool steel carbide material has an outer surface that is machined to a final valve seat profile.

According to another aspect, the chemical composition of the copper alloy material includes from about 50% to about 70% of copper, from zero to about 30% of nickel, and from zero to about 0.5% titanium, and the chemical composition of the copper alloy/tool steel carbide material includes from about 50% to about 70% of copper, from zero to about 30% of nickel, from zero to about 30% of aluminum, from zero to about 10% of iron, from zero to about 8% of manganese, from zero to about 10% of silicone, and from zero to about 10% tool steel.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
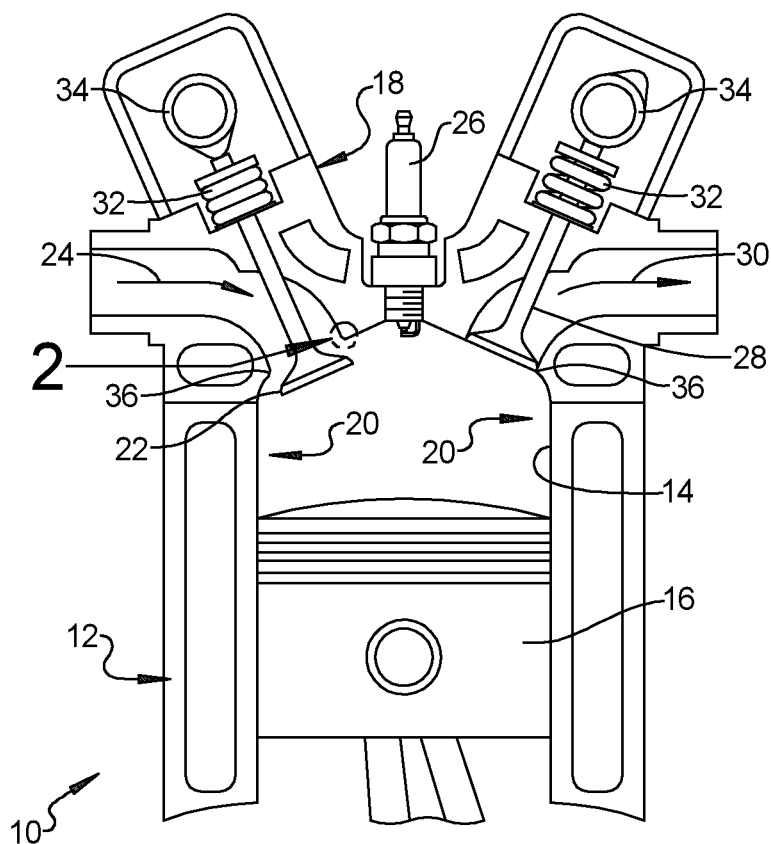
FIG. 1 is a side sectional view of a cylinder, part of an engine block and part of a cylinder head of an internal combustion engine having a valve seat according to an exemplary embodiment of the present disclosure.

Referring to FIG. 1, an internal combustion engine 10 includes an engine block 12 having a cylinder 14 formed therein. A piston 16 is positioned within the cylinder 14 and moves up and down within the cylinder 14 during operation of the engine 10. An intake manifold 18 is mounted onto the engine block 12. The intake manifold 18 seals the cylinder 14, and a combustion chamber 20 is defined by the piston 16, the cylinder 14 and the intake manifold 18.

The only way for air and fuel to enter and leave the combustion chamber 20 is through valves. An intake valve 22 opens and allows fuel and air to enter the combustion chamber, as indicated by arrow 24. After fuel and air enter the combustion chamber 20, the intake valve 22 closes, sealing the combustion chamber 20. A spark plug 26 ignites the air fuel mixture within the combustion chamber 20. After combustion, an exhaust valve 28 opens and allows exhaust gases to exit from the combustion chamber 20, as indicated by arrow 30. Springs 32 and cam shafts 34 control the opening and closing of the intake and exhaust valves 22, 28 during operation of the engine 10.

Each of the intake valve 22 and the exhaust valve 28 has a corresponding valve seat 36 formed within the intake manifold 18. The intake manifold 18 is aluminum. The valve seats 36 are adapted to support and seal the intake and exhaust valves 22, 28 when the intake and exhaust valves 22, 28 are closed.

It should be understood by those skilled in the art that the internal combustion engine shown in FIG. 1 is an exemplary embodiment of a valve seat 36 according to the present disclosure. The novel aspects of the valve seat 36 of the present disclosure are applicable to any other internal combustion engine application incorporating intake and exhaust valves 22, 28 to a combustion chamber 20 and having a valve seat 36 formed within an aluminum engine component.

Figure 2:
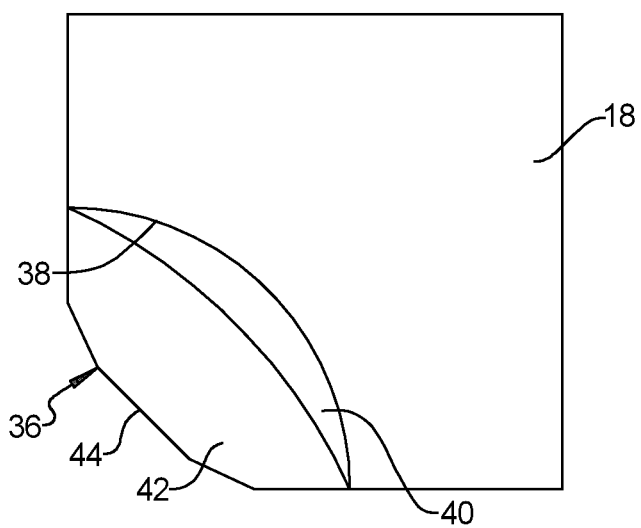
FIG. 2 is a is an enlarged portion of FIG. 1, as indicated by the circle labeled "FIG. 2" in FIG. 1.

Referring to FIG. 2, an enlarged portion of the valve seat 36 for the intake valve 22 is shown. It should be understood that an enlarged portion of the valve seat 36 of the exhaust valve 28 is identical to the enlarged portion of the intake valve 22 shown in FIG. 2. The valve seats 36 for the intake and exhaust valves 22, 28 are identical. For each valve seat 36, the intake manifold 18 includes a valve seat surface 38 that is machined within the intake manifold 18. The valve seat 36 includes a layer of copper alloy material 40 deposited onto the valve seat surface 38 of the aluminum intake manifold 18, and a layer of copper alloy/tool steel carbide material 42 deposited onto the layer of copper alloy material 40. An outer surface 44 of the layer of copper alloy/tool steel carbide material 42 is machined to a final valve seat profile to provide proper support and sealing characteristics for the respective intake or exhaust valve 22, 28.

Figure 3:
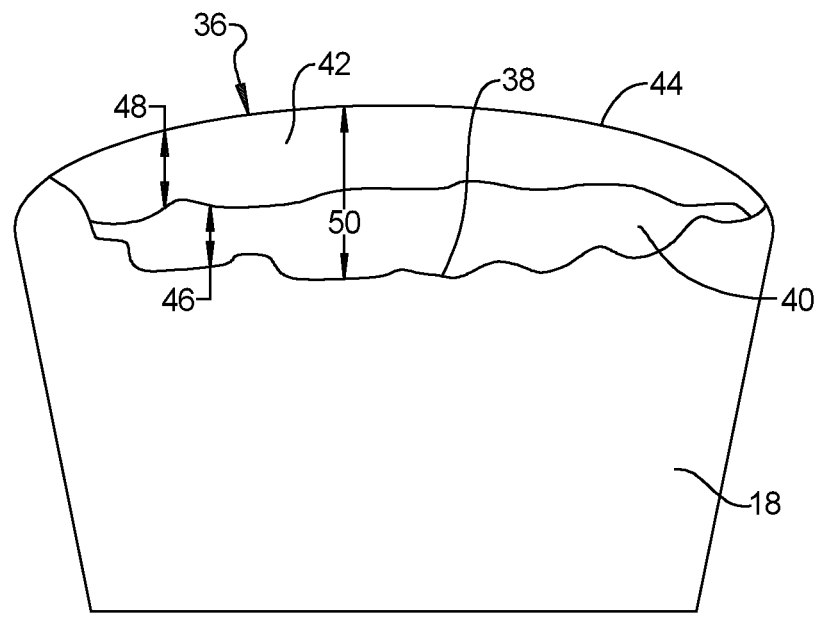
FIG. 3 is a schematic side sectional view of a portion of a valve seat according to an exemplary embodiment.

In an exemplary embodiment, the layer of copper alloy material 40 is laser clad onto the valve seat surface 38. Referring to FIG. 3, a schematic view of the valve seat 36 is shown. In an exemplary embodiment, an average thickness 46 of the layer of copper alloy material 40 is less than 0.5 millimeters.

In an exemplary embodiment, the layer of copper alloy/tool steel carbide material 42 is laser clad onto the layer of copper alloy material 40. Referring again to FIG. 3, an average thickness 48 of the layer of copper alloy/tool steel carbide material 42 is less than 0.5 millimeters.

Laser cladding is a process that uses a high power laser beam to fuse the layer of copper alloy material 40 onto the valve seat surface 38 and to fuse the layer of copper alloy/tool steel carbide material 42 onto the layer of copper alloy material 40. This forms a pore and crack-free coating which is perfectly bonded with limited dilution. This enables both materials to retain their original properties. As a result, surface properties are improved, thus considerably extending the service life of the valve seat 36.

In an exemplary embodiment, the chemical composition of the layer of copper alloy material 40 includes from about 50% to about 70% of copper, from zero to about 30% of nickel, and from zero to about 0.5% titanium. It should be understood that the term "about" denotes +/−5%.

The chemical composition of the layer of copper alloy/tool steel carbide material 42 includes from about 50% to about 70% of copper, from zero to about 30% of nickel, from zero to about 30% of aluminum, from zero to about 10% of iron, from zero to about 8% of manganese, from zero to about 10% of silicone, and from zero to about 10% tool steel.

The layer of copper alloy material 40 provides an intermediate layer between the layer of copper alloy/tool steel carbide material 42 and the valve seat surface 38 of the aluminum intake manifold 18. The layer of copper alloy material 40 creates a strong bond to the aluminum intake valve 18, and the layer of copper alloy/tool steel carbide material 42 forms a strong bond to the layer of copper alloy material 40. These bonds are strong enough to withstand the stresses experienced by the valve seat 36 during opening and closing of the valves 22, 28. The layer of copper alloy/tool steel carbide material 42 provides thermal conductivity and wear resistance. The intermediate layer of copper alloy material 40 provides a strong fusion bond between the layer of copper alloy/tool steel carbide material 42 and the aluminum intake manifold 18 without brittle aluminum/iron intermetallic phases that would be formed if the layer of copper alloy/tool steel carbide material 42 was formed directly onto the aluminum intake manifold 18.

Referring again to FIG. 3, an average combined thickness 50 of the layer of copper alloy material 40 and the layer of copper alloy/tool steel carbide material 42 is less than 1 millimeter.

Figure 4:
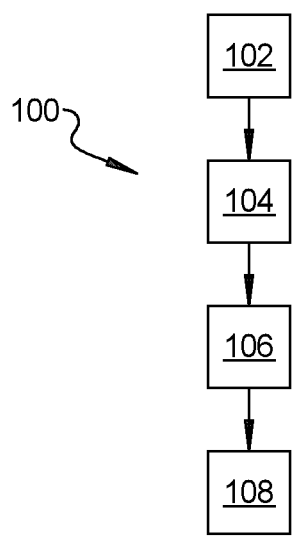
FIG. 4 is a flow chart illustrating a method of forming a valve seat according to an exemplary embodiment.

Referring to FIG. 4, a method 100 of forming a valve seat 36 within an aluminum engine component, such as the intake manifold 18 of the internal combustion engine 10 shown in FIG. 1 is shown.

Starting at block 102, the method includes machining and cleaning a valve seat surface 38 within the aluminum engine component. Moving to block 104, the method includes depositing a layer of copper alloy material 40 onto the valve seat surface 38 of the aluminum engine component. In an exemplary embodiment, the method includes laser cladding a layer of copper alloy material 40 onto the valve seat surface 38 of the aluminum engine component. In another exemplary embodiment, the method includes laser cladding a layer of copper alloy material 40 having an average thickness 46 of less than 0.5 millimeters onto the valve seat surface 38 of the aluminum engine component. The chemical composition of the layer of copper alloy material 40 includes from about 50% to about 70% of copper, from zero to about 30% of nickel, and from zero to about 0.5% titanium Moving to block 106, the method includes depositing a layer of copper alloy/tool steel carbide material 42 onto the layer of copper alloy material 40. In an exemplary embodiment, the method includes laser cladding a layer of copper alloy/tool steel carbide material 42 onto the layer of copper alloy material 40. In another exemplary embodiment, the method includes laser cladding a layer of copper alloy/tool steel carbide material 42 having an average thickness 48 of less than 0.5 millimeters onto the layer of copper alloy material 40. The chemical composition of the layer of copper alloy/tool steel carbide material 42 includes from about 50% to about 70% of copper, from zero to about 30% of nickel, from zero to about 30% of aluminum, from zero to about 10% of iron, from zero to about 8% of manganese, from zero to about 10% of silicone, and from zero to about 10% tool steel.

Moving to block 108, the method includes machining an outer surface 44 of the layer of copper alloy/tool steel carbide material 42 to a final valve seat profile, wherein an average combined thickness 50 of the layer of copper alloy material 40 and the layer of copper alloy/tool steel carbide material 42 is less than 1 millimeter.

Figure 5A:
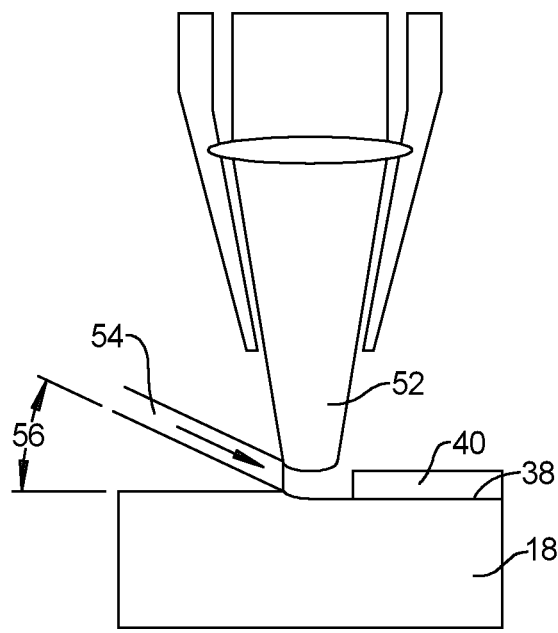
FIG. 5A is a perspective view of a layer of copper alloy material being deposited by a wire feed laser cladding process.
Figure 5B:
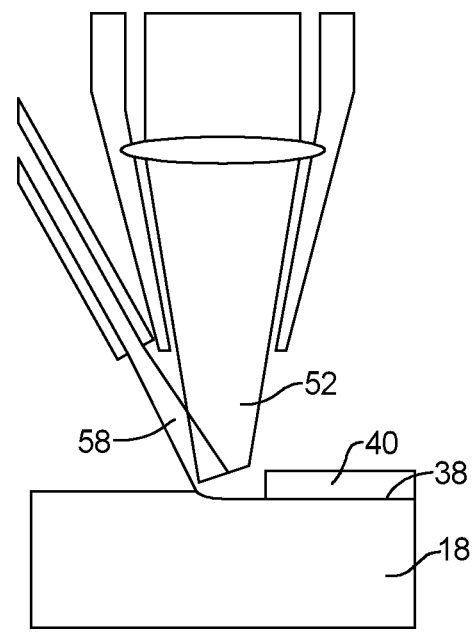
FIG. 5B is a perspective view of a layer of copper alloy material being deposited by a powder feed laser cladding process.

Referring to FIG. 5A, in an exemplary embodiment, the layer of copper alloy material 40 is laser clad onto the valve seat surface 38 by a wire feed laser cladding process. Laser cladding with external wire feed requires an exact positioning of a laser beam 52 and a wire of copper alloy material 54. The reference point is where a center axis of the wire of copper alloy material 54 intersects with the valve seat surface 38. The wire feed angle 56 also notably influences the welding result, thus extremely high precision needs to be ensured at high welding rates and high wire feed rates, thus placing special demands on the wire feed system. Referring to FIG. 5B, in another exemplary embodiment, the layer of copper alloy material 40 is laser clad onto the valve seat surface 38 by a powder feed laser cladding process, wherein copper alloy powder 58 is sprayed onto the valve seat surface 38 where the laser beam 52 intersects the valve seat surface 38.

Figure 6A:
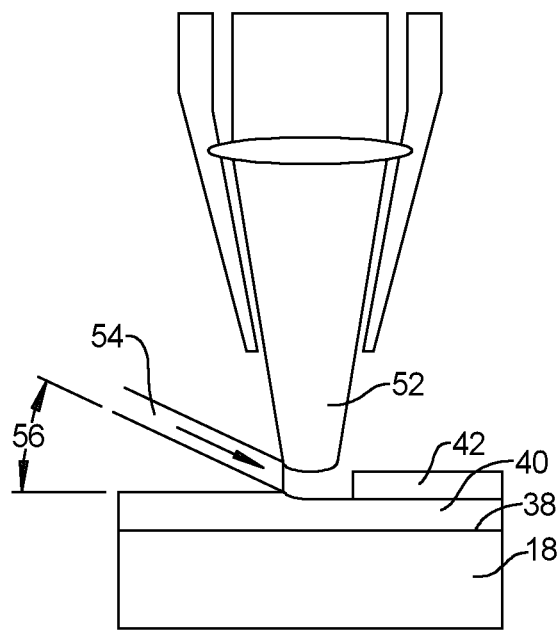
FIG. 6A is a perspective view of a layer of copper alloy/tool steel carbide material being deposited onto a layer of copper alloy material by a wire feed laser cladding process.
Figure 6B:
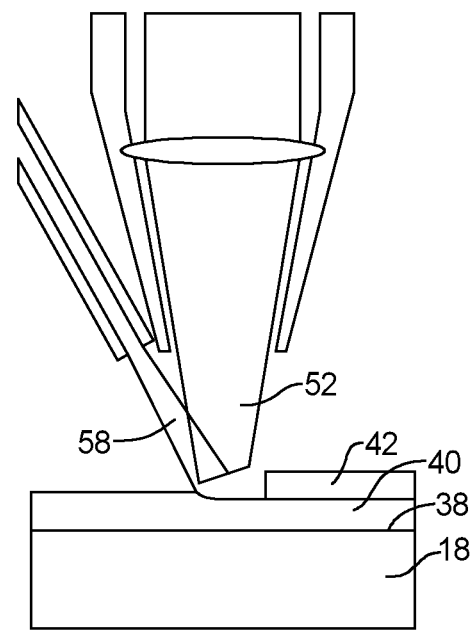
FIG. 6B is a perspective view of a layer of copper alloy/tool steel carbide material being deposited onto a layer of copper alloy material by a powder feed laser cladding process.

Referring to FIG. 6A, in an exemplary embodiment, the layer of copper alloy/tool steel carbide material 42 is laser clad onto the layer of copper alloy material 40 by a wire feed laser cladding process. Referring to FIG. 6B, in another exemplary embodiment, the layer of copper alloy/tool steel carbide material 42 is laser clad onto the layer of copper alloy material 40 by a powder feed laser cladding process.

A method of forming a valve seat 36 formed from a layer of copper alloy/tool steel carbide material 42 laser clad on an aluminum engine component of the present disclosure offers the advantage of forming a strong fusion bond between the copper alloy/tool steel carbide material 42 and the aluminum engine component with an intermediate layer of copper alloy material 40 that avoids the formation of brittle aluminum/iron intermetallic phases that would result if the layer of copper alloy/tool steel carbide material 42 was laser clad directly onto the aluminum engine component.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of forming a valve seat within an aluminum engine component, comprising:
   machining a valve seat surface within the aluminum engine component;
   depositing a layer of copper alloy material onto the valve seat surface of the aluminum engine component;
   depositing a layer of copper alloy/tool steel carbide material onto the layer of copper alloy material, wherein the copper alloy/tool steel carbide material has a chemical composition including more than zero and up to about 10% tool steel; and
   machining an outer surface of the layer of copper alloy/tool steel carbide material to a final valve seat profile.

2. The method of claim 1, wherein depositing the layer of copper alloy material onto the valve seat surface of the aluminum engine component further includes: laser cladding the layer of copper alloy material onto the valve seat surface of the aluminum engine component.

3. The method of claim 2, wherein the laser cladding the layer of copper alloy material onto the valve seat surface of the aluminum engine component further includes laser cladding of the layer of copper alloy material onto the valve seat surface of the aluminum engine component at a thickness less than 2 mm millimeters.

4. The method of claim 2, wherein the depositing the layer of copper alloy/tool steel carbide material onto the layer of copper alloy material further includes: laser cladding the layer of copper alloy/tool steel carbide material onto the layer of copper alloy material.

5. The method of claim 4, wherein the laser cladding the layer of copper alloy/tool steel carbide material onto the layer of copper alloy material further includes, laser cladding the layer of copper alloy/tool steel carbide material onto the layer of copper alloy material at a thickness less than 2.0 millimeters.

6. The method of claim 4, wherein a chemical composition of the layer of copper alloy material includes:
   from about 50% to about 70% of copper;
   from zero to about 30% of nickel; and
   from zero to about 0.5% titanium.

7. The method of claim 6, wherein a chemical composition of the layer of copper alloy/tool steel carbide material further includes:
   from about 50% to about 70% of copper;
   from zero to about 30% of nickel;
   from zero to about 30% of aluminum;
   from zero to about 10% of iron;
   from zero to about 8% of manganese; and
   from zero to about 10% of silicone.

8. The method of claim 7, wherein an average combined thickness of the layer of copper alloy material and the layer of copper alloy/tool steel carbide material is less than 2 millimeters.

9. The method of claim 8, wherein the layer of copper alloy material and the layer of copper alloy/tool steel carbide material are laser clad with a wire feed laser cladding process.

10. The method of claim 8, wherein the layer of copper alloy material and the layer of copper alloy/tool steel carbide material are laser clad with a powder feed laser cladding process.

11. A valve seat formed within an aluminum engine component, comprising:
    a valve seat surface machined within the aluminum engine component;
    a layer of copper alloy material deposited onto the valve seat surface of the aluminum engine component; and
    a layer of copper alloy/tool steel carbide material deposited onto the layer of copper alloy material, wherein the layer of copper alloy/tool steel carbide material has an outer surface that is machined to a final valve seat profile, and has a chemical composition including more than zero and up to about 10% tool steel.

12. The valve seat of claim 11, wherein the layer of copper alloy material is laser clad onto the valve seat surface of the aluminum engine component.

13. The valve seat of claim 12, wherein a thickness of the layer of copper alloy material is less than 2.0 millimeters.

14. The valve seat of claim 12, wherein the layer of copper alloy/tool steel carbide material is laser clad onto the layer of copper alloy material.

15. The valve seat of claim 14, wherein a thickness of the layer of copper alloy/tool steel carbide material is less than 2.0 millimeters.

16. The valve seat of claim 14, wherein a chemical composition of the layer of copper alloy material includes:
    from about 50% to about 70% of copper;
    from zero to about 30% of nickel; and
    from zero to about 0.5% titanium.

17. The valve seat of claim 16, wherein a chemical composition of the layer of copper alloy/tool steel carbide material further includes:
    from about 50% to about 70% of copper;
    from zero to about 30% of nickel;
    from zero to about 30% of aluminum;
    from zero to about 10% of iron;
    from zero to about 8% of manganese; and
    from zero to about 10% of silicone.

18. The valve seat of claim 17, wherein an average combined thickness of the layer of copper alloy material and the layer of copper alloy/tool steel carbide material is less than 2 millimeters.

19. A valve seat formed within an aluminum engine component, comprising:
    a valve seat surface machined within the aluminum engine component;
    a layer of copper alloy material laser clad onto the valve seat surface of the aluminum engine component, the layer of copper alloy material having a thickness of less than 2.0 millimeters; and
    a layer of copper alloy/tool steel carbide material laser clad onto the layer of copper alloy material, the layer of copper alloy/tool steel carbide material having an average thickness of less than 2.0 millimeters, wherein the layer of copper alloy/tool steel carbide material has an outer surface that is machined to a final valve seat profile, and has a chemical composition including more than zero percent and up to about ten percent tool steel.

20. The valve seat of claim 19, wherein a chemical composition of the layer of copper alloy material includes:
   from about 50% to about 70% of copper;
   from zero to about 30% of nickel; and
   from zero to about 0.5% titanium; and
   a chemical composition of the layer of copper alloy/tool steel carbide material further includes:
   from about 50% to about 70% of copper;
   from zero to about 30% of nickel;
   from zero to about 30% of aluminum;
   from zero to about 10% of iron;
   from zero to about 8% of manganese; and
   from zero to about 10% of silicone.

* * * * *